US010977727B1

(12) United States Patent
Smith

(10) Patent No.: US 10,977,727 B1
(45) Date of Patent: Apr. 13, 2021

(54) WEB-BASED SYSTEM AND METHOD FOR PROVIDING COMPREHENSIVE VEHICLE BUILD INFORMATION

(71) Applicant: Auto I.D., Inc., Nashville, TN (US)

(72) Inventor: Sean C. Smith, Hendersonville, TN (US)

(73) Assignee: Auto I.D., Inc., Nashville, TN (US)

( * ) Notice: Subject to any disclaimer, the term of this patent is extended or adjusted under 35 U.S.C. 154(b) by 12 days.

(21) Appl. No.: 16/114,931

(22) Filed: Aug. 28, 2018

Related U.S. Application Data

(63) Continuation-in-part of application No. 13/297,438, filed on Nov. 16, 2011, now abandoned.

(60) Provisional application No. 61/415,207, filed on Nov. 18, 2010.

(51) Int. Cl.
*G06Q 40/02* (2012.01)
*G06F 16/22* (2019.01)
*G06F 16/955* (2019.01)

(52) U.S. Cl.
CPC .......... *G06Q 40/025* (2013.01); *G06F 16/22* (2019.01); *G06F 16/955* (2019.01)

(58) Field of Classification Search
CPC ...... G06Q 40/025; G06F 16/22; G06F 16/955
See application file for complete search history.

(56) References Cited

U.S. PATENT DOCUMENTS

| 4,989,144 A | 1/1991 | Barnett, III |
| 5,120,704 A | 6/1992 | Lechter et al. |
| 5,201,010 A | 4/1993 | Deaton et al. |

(Continued)

FOREIGN PATENT DOCUMENTS

| EP | 0 749 081 | 12/1996 |
| EP | 1 122 664 | 8/2001 |

(Continued)

OTHER PUBLICATIONS

U.S. Appl. No. 13/297,438, Web-Based System and Method for Providing Comprehensive Vehicle Build Information, filed Nov. 16, 2011.

(Continued)

*Primary Examiner* — Patrice L Winder
*Assistant Examiner* — Angela M Widhalm De Rodrig
(74) *Attorney, Agent, or Firm* — Knobbe, Martens, Olson & Bear, LLP

(57) ABSTRACT

A hosted web-accessible system, computer program and methods are provided for generating comprehensive vehicle trim and detailed equipment information for clients, including providing comparative estimation based on underlying information regarding a particular vehicle. Comprehensive original vehicle data is obtained from vehicle manufacturers via a vehicle source interface, the data including a unique vehicle identifier for each of one or more vehicles associated with the respective source. A vehicle information request with a vehicle identifier is received from a client, and comprehensive original vehicle data is identified based on the unique identifier and the identifier from the client request. A client response interface displays vehicle data from the identified set of comprehensive original vehicle data. Vehicle valuation may be obtained from third party evaluators according to the vehicle request and based on the original vehicle data.

20 Claims, 2 Drawing Sheets

(56) References Cited

U.S. PATENT DOCUMENTS

| | | |
|---|---|---|
| 5,216,612 A | 6/1993 | Cornett et al. |
| 5,488,360 A | 1/1996 | Ray |
| 5,532,838 A | 7/1996 | Barbari |
| 5,630,070 A | 5/1997 | Dietrich et al. |
| 5,748,098 A | 5/1998 | Grace |
| 5,765,143 A | 6/1998 | Sheldon et al. |
| 5,819,234 A | 10/1998 | Slavin et al. |
| 5,878,403 A | 3/1999 | DeFrancesco |
| 5,940,812 A | 8/1999 | Tengel et al. |
| 5,950,169 A | 9/1999 | Borghesi et al. |
| 5,963,129 A | 10/1999 | Warner |
| 5,995,947 A | 11/1999 | Fraser et al. |
| 6,006,201 A | 12/1999 | Berent et al. |
| 6,038,554 A | 3/2000 | Vig |
| 6,052,065 A | 4/2000 | Glover |
| 6,052,068 A | 4/2000 | Price R-W et al. |
| 6,076,064 A | 6/2000 | Rose, Jr. |
| 6,126,332 A | 10/2000 | Cubbage et al. |
| 6,154,152 A | 11/2000 | Ito |
| 6,182,048 B1 | 1/2001 | Osborn et al. |
| 6,208,979 B1 | 3/2001 | Sinclair |
| 6,236,977 B1 | 5/2001 | Verba et al. |
| 6,278,936 B1 | 8/2001 | Jones |
| 6,282,517 B1 | 8/2001 | Wolfe et al. |
| 6,330,499 B1 | 12/2001 | Chou et al. |
| 6,330,546 B1 | 12/2001 | Gopinathan et al. |
| 6,430,539 B1 | 8/2002 | Lazarus et al. |
| 6,516,239 B1 * | 2/2003 | Madden ........... G05B 19/41815 700/115 |
| 6,587,841 B1 | 7/2003 | DeFrancesco |
| 6,714,859 B2 | 3/2004 | Jones |
| 6,738,748 B2 | 5/2004 | Wetzer |
| 6,754,564 B2 | 6/2004 | Newport |
| 6,760,794 B2 | 7/2004 | Deno et al. |
| 6,772,145 B2 | 8/2004 | Shishido |
| 6,804,606 B2 | 10/2004 | Jones |
| 6,839,682 B1 | 1/2005 | Blume et al. |
| 6,904,359 B2 | 6/2005 | Jones |
| 6,938,021 B2 | 8/2005 | Shear et al. |
| 6,959,281 B1 | 10/2005 | Freeling et al. |
| 7,024,418 B1 | 4/2006 | Childress |
| 7,050,982 B2 | 5/2006 | Sheinson et al. |
| 7,069,118 B2 | 6/2006 | Coletrane et al. |
| 7,092,898 B1 | 8/2006 | Mattick et al. |
| 7,113,853 B2 | 9/2006 | Hecklinger |
| 7,130,821 B1 | 10/2006 | Connors et al. |
| 7,181,427 B1 | 2/2007 | DeFrancesco |
| 7,184,974 B2 | 2/2007 | Shishido |
| 7,191,058 B2 | 3/2007 | Laird et al. |
| 7,228,298 B1 | 6/2007 | Raines |
| 7,288,298 B2 | 6/2007 | Raines |
| 7,275,083 B1 | 9/2007 | Seibel et al. |
| 7,366,694 B2 | 4/2008 | Lazerson |
| 7,392,203 B2 | 6/2008 | Edison et al. |
| 7,392,221 B2 | 6/2008 | Nabe et al. |
| 7,421,322 B1 | 9/2008 | Silversmith et al. |
| 7,444,302 B2 | 10/2008 | Hu et al. |
| 7,472,088 B2 | 12/2008 | Taylor et al. |
| RE40,692 E | 3/2009 | Rose, Jr. |
| 7,505,838 B2 | 3/2009 | Raines et al. |
| 7,561,963 B2 | 7/2009 | Brice et al. |
| 7,567,922 B1 * | 7/2009 | Weinberg ............. G06Q 30/00 705/26.5 |
| 7,571,139 B1 | 8/2009 | Giordano et al. |
| 7,580,856 B1 | 8/2009 | Pliha |
| 7,590,589 B2 | 9/2009 | Hoffberg |
| 7,593,893 B1 | 9/2009 | Ladd et al. |
| 7,596,512 B1 * | 9/2009 | Raines ................. G06Q 30/02 705/26.4 |
| 7,603,293 B2 | 10/2009 | Chenn |
| 7,610,257 B1 | 10/2009 | Abrahams |
| 7,630,932 B2 | 12/2009 | Danaher et al. |
| 7,653,592 B1 | 1/2010 | Flaxman et al. |
| 7,693,896 B1 | 4/2010 | Raines |
| 7,739,142 B2 | 6/2010 | Chand et al. |
| 7,778,841 B1 | 8/2010 | Bayer et al. |
| 7,788,147 B2 | 8/2010 | Haggerty et al. |
| 7,835,940 B2 | 11/2010 | Kowalchuk |
| 7,865,409 B1 | 1/2011 | Monaghan |
| 7,877,320 B1 | 1/2011 | Downey |
| 7,925,654 B1 | 4/2011 | Raines |
| 7,945,478 B2 | 5/2011 | Hogan et al. |
| 7,962,404 B1 | 6/2011 | Metzger, II et al. |
| 7,966,210 B2 | 6/2011 | Hall et al. |
| 7,974,886 B2 | 7/2011 | Coleman |
| 7,991,689 B1 | 8/2011 | Brunzell et al. |
| 8,005,759 B2 | 8/2011 | Hirtenstein et al. |
| 8,005,795 B2 | 8/2011 | Galipeau et al. |
| 8,036,952 B2 | 10/2011 | Mohr et al. |
| 8,055,544 B2 * | 11/2011 | Ullman ................ G06Q 10/087 705/22 |
| 8,078,524 B2 | 12/2011 | Crawford et al. |
| 8,104,671 B2 | 1/2012 | Besecker et al. |
| 8,121,938 B1 | 2/2012 | Zettner et al. |
| 8,185,417 B1 | 5/2012 | Brown et al. |
| 8,219,464 B2 | 7/2012 | Inghelbrecht et al. |
| 8,239,388 B2 | 8/2012 | Raines |
| 8,244,563 B2 | 8/2012 | Coon et al. |
| 8,255,243 B2 | 8/2012 | Raines et al. |
| 8,255,244 B2 | 8/2012 | Raines et al. |
| 8,285,656 B1 | 10/2012 | Chang et al. |
| 8,355,983 B1 | 1/2013 | Parr et al. |
| 8,380,594 B2 | 2/2013 | Berkman et al. |
| 8,392,334 B2 | 3/2013 | Hirtenstein et al. |
| 8,438,048 B1 | 5/2013 | Benavides, III |
| 8,438,170 B2 | 5/2013 | Koran et al. |
| 8,560,161 B1 | 10/2013 | Kator et al. |
| 8,595,079 B1 | 11/2013 | Raines et al. |
| 8,600,783 B2 | 12/2013 | Smith et al. |
| 8,600,823 B1 | 12/2013 | Raines et al. |
| 8,606,648 B1 | 12/2013 | Bayer et al. |
| 8,626,560 B1 | 1/2014 | Anderson |
| 8,630,929 B2 | 1/2014 | Haggerty et al. |
| 8,645,193 B2 | 2/2014 | Swinson et al. |
| 8,725,584 B1 | 5/2014 | Eager et al. |
| 9,053,589 B1 | 6/2015 | Kator et al. |
| 9,053,590 B1 | 6/2015 | Kator et al. |
| 9,076,276 B1 | 7/2015 | Kator et al. |
| 9,087,335 B2 | 7/2015 | Rane et al. |
| 9,105,048 B2 | 8/2015 | Koran et al. |
| 9,123,056 B2 | 9/2015 | Singh et al. |
| 9,147,217 B1 | 9/2015 | Zabritski et al. |
| 9,292,860 B2 | 3/2016 | Singh et al. |
| 9,501,781 B2 | 11/2016 | Singh et al. |
| 9,646,308 B1 | 5/2017 | Eager et al. |
| 9,690,820 B1 | 6/2017 | Girulat, Jr. |
| 9,697,544 B1 | 7/2017 | Bayer et al. |
| 9,741,066 B2 | 8/2017 | Eager et al. |
| 10,162,848 B2 | 12/2018 | Mohan et al. |
| 10,163,156 B1 | 12/2018 | Shapley et al. |
| 10,380,654 B2 | 8/2019 | Hirtenstein et al. |
| 10,409,867 B1 | 9/2019 | Von Busch et al. |
| 10,565,181 B1 | 2/2020 | Hjermstad et al. |
| 10,580,054 B2 | 3/2020 | Cain et al. |
| 10,581,825 B2 | 3/2020 | Poschel et al. |
| 2001/0044769 A1 | 11/2001 | Chaves |
| 2002/0023051 A1 | 2/2002 | Kunzle et al. |
| 2002/0042752 A1 | 4/2002 | Chaves |
| 2002/0072964 A1 | 6/2002 | Choi |
| 2002/0082978 A1 | 6/2002 | Ghouri et al. |
| 2002/0091706 A1 | 7/2002 | Anderson et al. |
| 2002/0099628 A1 | 7/2002 | Takaoka et al. |
| 2002/0103622 A1 | 8/2002 | Burge |
| 2002/0128960 A1 | 9/2002 | Lambiotte et al. |
| 2002/0161496 A1 | 10/2002 | Yamaki |
| 2002/0193925 A1 | 12/2002 | Funkhouser et al. |
| 2003/0033242 A1 | 2/2003 | Lynch et al. |
| 2003/0041019 A1 | 2/2003 | Vagim, III et al. |
| 2003/0046179 A1 | 3/2003 | Anabtawi et al. |
| 2003/0101111 A1 | 5/2003 | Dang et al. |
| 2003/0105728 A1 | 6/2003 | Yano et al. |
| 2003/0144950 A1 | 7/2003 | O'Brien et al. |
| 2003/0177481 A1 | 9/2003 | Amaru et al. |
| 2003/0187753 A1 | 10/2003 | Takaoka |

(56) References Cited

U.S. PATENT DOCUMENTS

| | | |
|---|---|---|
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0034657 A1 | 2/2004 | Zambo et al. |
| 2004/0107125 A1 | 6/2004 | Guheen et al. |
| 2004/0128262 A1 | 7/2004 | Nafousi |
| 2004/0163101 A1 | 8/2004 | Swix |
| 2004/0193644 A1 | 9/2004 | Baker et al. |
| 2004/0243506 A1 | 12/2004 | Das |
| 2004/0249532 A1 | 12/2004 | Kelly et al. |
| 2005/0010555 A1 | 1/2005 | Gallivan |
| 2005/0021384 A1 | 1/2005 | Pantaleo et al. |
| 2005/0038580 A1 | 2/2005 | Seim et al. |
| 2005/0113991 A1 | 5/2005 | Rogers et al. |
| 2005/0177489 A1 | 8/2005 | Neff et al. |
| 2005/0209892 A1 | 9/2005 | Miller |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267754 A1 | 12/2005 | Schultz et al. |
| 2005/0267774 A1 | 12/2005 | Merritt et al. |
| 2006/0004731 A1 | 1/2006 | Seibel et al. |
| 2006/0010052 A1 | 1/2006 | Willingham |
| 2006/0015425 A1 | 1/2006 | Brooks |
| 2006/0031182 A1 | 2/2006 | Ryan et al. |
| 2006/0041443 A1 | 2/2006 | Horvath |
| 2006/0107560 A1 | 5/2006 | Wong |
| 2006/0149674 A1 | 7/2006 | Cook et al. |
| 2006/0163868 A1 | 7/2006 | Baumann |
| 2006/0178957 A1 | 8/2006 | LeClaire |
| 2006/0178973 A1 | 8/2006 | Chiovari et al. |
| 2006/0202012 A1 | 9/2006 | Grano et al. |
| 2006/0202862 A1 | 9/2006 | Ratnakar |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0277141 A1* | 12/2006 | Palmer .................. G06Q 40/02 705/38 |
| 2007/0011083 A1 | 1/2007 | Bird et al. |
| 2007/0027791 A1 | 2/2007 | Young et al. |
| 2007/0059442 A1 | 3/2007 | Sabeta |
| 2007/0136163 A1 | 6/2007 | Bell |
| 2007/0156515 A1 | 7/2007 | Hasselback et al. |
| 2007/0162293 A1 | 7/2007 | Malkon |
| 2007/0179798 A1 | 8/2007 | Inbarajan |
| 2007/0179860 A1 | 8/2007 | Romero |
| 2007/0185777 A1 | 8/2007 | Pyle et al. |
| 2007/0192165 A1 | 8/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0288271 A1 | 12/2007 | Klinkhammer |
| 2007/0294163 A1 | 12/2007 | Harmon et al. |
| 2008/0015954 A1 | 1/2008 | Huber et al. |
| 2008/0016119 A1* | 1/2008 | Sharma ............ G05B 19/41875 |
| 2008/0059317 A1 | 3/2008 | Chandran et al. |
| 2008/0071882 A1 | 3/2008 | Hering et al. |
| 2008/0097663 A1 | 4/2008 | Morimoto |
| 2008/0120155 A1 | 5/2008 | Pliha |
| 2008/0126137 A1 | 5/2008 | Kidd et al. |
| 2008/0177590 A1 | 7/2008 | Brodsky et al. |
| 2008/0183689 A1 | 7/2008 | Kubota et al. |
| 2008/0201163 A1 | 8/2008 | Barker et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301188 A1 | 12/2008 | O'Hara |
| 2008/0312969 A1 | 12/2008 | Raines et al. |
| 2009/0018996 A1 | 1/2009 | Hunt et al. |
| 2009/0055044 A1 | 2/2009 | Dienst |
| 2009/0083130 A1 | 3/2009 | Hall et al. |
| 2009/0138290 A1* | 5/2009 | Holden ................ G06Q 10/087 705/4 |
| 2009/0144201 A1 | 6/2009 | Gierkink et al. |
| 2009/0187513 A1 | 7/2009 | Noy et al. |
| 2009/0240735 A1 | 9/2009 | Grandhi et al. |
| 2009/0271296 A1 | 10/2009 | Romero |
| 2009/0271385 A1 | 10/2009 | Krishnamoorthy et al. |
| 2009/0287370 A1 | 11/2009 | Iwai et al. |
| 2010/0030649 A1 | 2/2010 | Ubelhor |
| 2010/0070343 A1 | 3/2010 | Taira et al. |
| 2010/0070382 A1* | 3/2010 | Inghelbrecht ...... G06Q 30/0282 705/26.1 |
| 2010/0076881 A1 | 3/2010 | O'Grady et al. |
| 2010/0088158 A1 | 4/2010 | Pollack |
| 2010/0094664 A1 | 4/2010 | Bush et al. |
| 2010/0161486 A1 | 6/2010 | Liu et al. |
| 2010/0179861 A1 | 7/2010 | Teerilahti et al. |
| 2010/0198629 A1 | 8/2010 | Wesileder et al. |
| 2010/0217616 A1 | 8/2010 | Colson et al. |
| 2010/0223106 A1 | 9/2010 | Hallowell et al. |
| 2010/0293089 A1 | 11/2010 | Peterson et al. |
| 2010/0293181 A1 | 11/2010 | Muller et al. |
| 2010/0299190 A1 | 11/2010 | Pratt et al. |
| 2010/0332292 A1 | 12/2010 | Anderson |
| 2011/0022489 A1 | 1/2011 | Hallowell et al. |
| 2011/0040440 A1 | 2/2011 | de Oliveira et al. |
| 2011/0082759 A1 | 4/2011 | Swinson et al. |
| 2011/0137758 A1 | 6/2011 | Bienias |
| 2011/0161115 A1* | 6/2011 | Hampton ................ G06Q 40/08 705/4 |
| 2011/0202471 A1 | 8/2011 | Scott et al. |
| 2011/0213641 A1 | 9/2011 | Metzger, II et al. |
| 2011/0264595 A1 | 10/2011 | Anspach et al. |
| 2011/0270706 A1 | 11/2011 | Anspach et al. |
| 2011/0270707 A1 | 11/2011 | Breed et al. |
| 2011/0276467 A1 | 11/2011 | Blackburn et al. |
| 2011/0320241 A1 | 12/2011 | Miller |
| 2012/0005045 A1 | 1/2012 | Baker |
| 2012/0106801 A1 | 5/2012 | Jackson |
| 2012/0109770 A1 | 5/2012 | Seergy et al. |
| 2012/0197699 A1 | 8/2012 | Snell et al. |
| 2012/0221485 A1 | 8/2012 | Leidner et al. |
| 2012/0239637 A9 | 9/2012 | Prakash et al. |
| 2012/0254017 A1 | 10/2012 | Fusco et al. |
| 2012/0265648 A1 | 10/2012 | Jerome et al. |
| 2012/0271850 A1 | 10/2012 | Licata Messana et al. |
| 2012/0331010 A1 | 12/2012 | Christie |
| 2013/0006801 A1 | 1/2013 | Solari et al. |
| 2013/0006809 A1 | 1/2013 | Hollenshead et al. |
| 2013/0159033 A1 | 6/2013 | Weinstock et al. |
| 2013/0173453 A1 | 7/2013 | Raines et al. |
| 2013/0238455 A1 | 9/2013 | Laracey |
| 2013/0268298 A1 | 10/2013 | Elkins et al. |
| 2014/0082017 A1 | 3/2014 | Miller |
| 2014/0258309 A1 | 9/2014 | Young |
| 2015/0227942 A1 | 8/2015 | Sidman et al. |
| 2015/0310865 A1 | 10/2015 | Fay et al. |
| 2015/0324400 A1 | 11/2015 | Sheck et al. |
| 2015/0332411 A1 | 11/2015 | Bush et al. |
| 2015/0348145 A1 | 12/2015 | Nakajima |
| 2016/0004742 A1 | 1/2016 | Mohan et al. |
| 2016/0012494 A1 | 1/2016 | Lasini |
| 2016/0217046 A1 | 7/2016 | Lamoureux et al. |
| 2016/0267588 A1 | 9/2016 | Cain et al. |
| 2016/0299905 A1 | 10/2016 | Geyer et al. |
| 2016/0321726 A1 | 11/2016 | Singh et al. |
| 2016/0379486 A1 | 12/2016 | Taylor |
| 2017/0052652 A1 | 2/2017 | Denton et al. |
| 2017/0270490 A1 | 9/2017 | Penilla et al. |
| 2017/0323295 A1 | 11/2017 | Kranzley et al. |
| 2018/0018723 A1 | 1/2018 | Nagla et al. |
| 2018/0107676 A1 | 4/2018 | Vora |
| 2018/0108189 A1 | 4/2018 | Park et al. |
| 2018/0157761 A1 | 6/2018 | Halstead et al. |
| 2018/0165747 A1 | 6/2018 | Patten et al. |
| 2019/0295133 A1 | 9/2019 | Hirtenstein et al. |
| 2020/0065885 A1 | 2/2020 | Smith |

(56) References Cited

U.S. PATENT DOCUMENTS

FOREIGN PATENT DOCUMENTS

| | | |
|---|---|---|
| JP | 09-251486 | 9/1997 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| WO | WO 99/004350 | 1/1999 |
| WO | WO 99/022328 | 5/1999 |
| WO | WO 01/071458 | 9/2001 |
| WO | WO 01/075754 | 10/2001 |
| WO | WO 03/101123 | 12/2003 |
| WO | WO 2007/149941 | 12/2007 |
| WO | WO 2008/022289 | 2/2008 |
| WO | WO 2018/199992 | 11/2018 |

OTHER PUBLICATIONS

U.S. Appl. No. 14/080,416, System and Method for Providing Comprehensive Vehicle Information, filed Nov. 14, 2013.
U.S. Appl. No. 16/669,250, 2020/0065885, System and Method for Providing Comprehensive Vehicle Information, filed Oct. 30, 2019.
"Activant PartExpert with Vehicle Identification Number (VIN) Lookup", Activant Solutions, Inc., Livermore, CA, Copyright 2006, http://counterworks.com/PartExp_DS_092806.pdf, pp. 2.
"AutoConnect Partners with Organic to Build World's Most Comprehensive Online Emporium of Pre-Owned Vehicles", PR Newswire, May 19, 1998, pp. 2.
"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.
"Appraisal Tool", VAuto Live Market View, Dec. 14, 2007, http://www.vauto.com/vAuto_solution/appraisal.asp, pp. 3.
Autobytel.com, http://web.archive.org/web/20040806010507//http://autobytel.com/, as archived Aug. 6, 2004, pp. 3.
Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.
Bankrate.com, http://web.archive.org/web/20040809000026/www.bankrate.com/brm/default.asp, as archived Aug. 9, 2004, pp. 3.
"Carfax Teams with Esurance", PR Newswire, May 14, 2001, p. 1.
Cars.com, http://web.archive.org/web/20041010081241/www.cars.com/go/index.jsp?aff=national, as archived Oct. 10, 2004, pp. 2.
Carsdirect.com, http://web.archive.org/web/20040730142836/www.carsdirect.com/home, as archived Jul. 30, 2004, pp. 2.
Checkbook.org, http://web.archive.org/web/20040604192834/www.checkbook.org/auto/carbarg.cfm, as archived Jun. 4, 2004, p. 1.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
Cohen et al., "Optimizer: IBM's Multi Echelon Inventory System for Managing Service Logistics", Interfaces, vol. 20, No. 1, Jan.-Feb. 1990, pp. 65-82.
Copeland et al., "Wallet-on-Wheels—Using Vehicle's Identity for Secure Mobile Money", 17th International Conference on Intelligence in Next Generation Networks, 2013, pp. 102-109.
"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.
"Experian Uses SSA-NAME3 to Match 40 to 50 Million Transactions per Month Against an 11.5 Billion Row Database", DM Review, Apr. 2001, vol. 11, No. 4, pp. 3.
Farrell et al., "Installed Base and Compatibility: Innovation, Product Preannouncements, and Predation", The American Economic Review, Dec. 1986, vol. 76, No. 5, pp. 940-955.
Garcia-Molina et al., "Database Systems: The Complete Book", Prentice Hall, Inc., Ch. 15, 2002, pp. 713-715.
Grange, Frank, "Challenges in Modeling Demand for Inventory Optimization of Slow-Moving Items," Proceedings of the 1998 Winter Simulation Conference, 1998, pp. 1211-1217.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield et al., "Managing Component Life Cycles in Dynamic Technological Environments", International Journal of Purchasing and Materials Management, Tempe, Spring 1994, vol. 30, No. 2, pp. 20-28.
Inderfurth et al., "Decision Support for Spare Parts Acquisition in Post Product Life Cycle", Central European Journal of Operations Research, 2008, vol. 16, pp. 17-42.
"Intelligence Insight Impact", Polk Automotive Manufacturers; http://usa.polk.com/Industries/AutoMfr/Analyze/MarketAnalysis/, Dec. 13, 2007, pp. 3.
Invoicedealers.com, http://web.archive.org/web/20040804044511/http://www.invoicedealers.com/, Aug. 4, 2004, pp. 2.
Ivillage.com, http://web.archive.org/web/20040729234947/http://www.ivillage.com/, Jul. 29, 2004, pp. 2.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Käki, Anssi, "Forecasting in End-Of-Life Spare Parts Procurement", Master's Thesis, Helsinki University of Technology, System Analysis Laboratory, Jul. 27, 2007, pp. 84.
Kennedy et al., "An Overview of Recent Literature on Spare Parts Inventories", International Journal of Production Economics, 2002, vol. 76, pp. 201-215.
Kim et al., "Optimal Pricing, EOL (End of Life) Warranty, and Spare Parts Manufacturing Strategy Amid Product Transition", European Journal of Operation Research, 2008, vol. 188, pp. 723-745.
Koller, Mike, "Wireless Service Aids," InternetWeek, Jul. 9, 2001, p. 15.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lapide, Larry, "New Developments in Business Forecasting", The Journal of Business Forecasting, Spring 2002, pp. 12-14.
Lee, Ho Geun, "AUCNET: Electronic Intermediary for Used-Car Transactions", EM-Electronic Markets, Dec. 1997, vol. 7, No. 4, pp. 24-28.
Miller, Joe, "NADA Used-Car Prices Go Online", Automotive News, Jun. 14, 1999, p. 36.
Moore, John R., Jr. "Forecasting and Scheduling for Past-Model Replacement Parts", Management Science, Application Series, vol. 18, No. 4, Part 1, Dec. 1971, pp. B-200-B-213.
"NAAA-Recommended Vehicle Condition Grading Scale", Noted as early as 2007, pp. 3.
Packer, A. H., "Simulation and Adaptive Forecasting an Applied to Inventory Control", Operations Research, Jul. 1965, vol. 15, No. 4, pp. 660-679.

(56) References Cited

OTHER PUBLICATIONS

"Power Information Network: Power to Drive your Business", J.D. Power and Associates Power Information Network, http://www.powerinfonet.com/products/productDetail.asp?type=financialinstitutions, Dec. 13, 2007, pp. 2.

Peters, Peter-Paul, "A Spare Parts Configurator for the European Service Business" (Graduation Report), Honeywell, Industrial Service Logistic Center, Amsterdam, The Netherlands, Mar. 2000, pp. 80.

Porter, G. Zell, "An Economic Method for Evaluating Electronic Component Obsolescence Solutions", www.gidep.org/data/dmsms/library/zell.pdf, May 1998, pp. 1-9.

"Pricing Tool", vAuto Live Market View, http://www.avauto.com/vAuto_Solution/pricing.asp, Dec. 13, 2007, pp. 2.

Reinbach, Andrew, "MCIF Aids Banks in CRA Compliance", Bank Systems & Technology, Aug. 1995, vol. 32, No. 8, p. 27.

Roos, Gina, "Web-Based Service Helps OEMs Cure Parts Obsolescence Blues", Electronic Engineering Times, Oct. 8, 2001, p. 86.

Santarini, Michael, "Forecasts the Probable Obsolescence of Components—Module Predicts Parts Life", Electronic Engineering Times, Jan. 11, 1999, vol. 1, p. 48.

Sawyers, Arlena, "NADA to Offer Residual Guide", Automotive News, May 22, 2000, p. 1.

Shapiro et al., "Systems Competition and Aftermarkets: an Economic Analysis of Kodak", The Antitrust Bulletin, Spring 1994, pp. 135-162.

"Stoneage Corporation Announces Database of 250,000 Used Cars Posted to the Internet", PR Newswire, Feb. 24, 1998, p. 1.

Sullivan, Laurie, "Obsolete-Parts Program Thriving", EBN, Manhasset, NY, Jan. 21, 2002, Issue 1296, p. 26.

"Urban Science Launches Second Generation Lead Scoring Solution", Urban Science, Detroit, MI, Mar. 1, 2007, http://www.urbanscience.com/newsevents/pr_20070222.html, pp. 3.

"WashingtonPost.com and Cars.com Launch Comprehensive Automotive Web Site for the Washington Area", PR Newswire, Oct. 22, 1998. pp. 2.

Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.

Webster, Lee R., "Failure Rates & Life-Cycle Costs", Consulting-Specifying Engineer, Apr. 1998, vol. 23, No. 4, ABI/INFORM Global, p. 42.

"Web Sites Let Automotive Consumers Arm Themselves with Price Information", Orange County Register, Nov. 14, 1997, pp. 3.

"Yahoo! Autos Provides Enhanced Road Map for Researching, Buying and Selling Cars Online", PR Newswire, Oct. 13, 1998, pp. 2.

* cited by examiner

WEB-BASED SYSTEM AND METHOD FOR PROVIDING COMPREHENSIVE VEHICLE BUILD INFORMATION

CROSS-REFERENCES TO RELATED APPLICATIONS

This application is a continuation-in-part of U.S. patent application Ser. No. 13/297,438, filed on Nov. 16, 2011 and titled "Web-based System and Method for Providing Comprehensive Vehicle Build Information," which claimed benefit of and priority from: U.S. Provisional Patent Application No. 61/415,207, filed on Nov. 18, 2010, each of which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present disclosure relates generally to web-based systems and methods for providing and verifying vehicle information which is otherwise difficult to access or even unavailable, including providing comparative estimation based on underlying information regarding a particular vehicle. More particularly, the present disclosure relates to a host system and associated methods for producing and generating detailed information about the trim and optional equipment of a vehicle based on data provided from the vehicle manufacturer and a vehicle identifier provided from a third party entity such as a lender, dealer, auction or other consumer.

Currently, a vehicle has a vehicle identification number (VIN) that may provide basic information about the vehicle that has been coded into the VIN by a corresponding manufacturer. The information provided may include for example the country of origin, manufacturer, year of manufacture, manufacturing assembly plant, make and model, etc., but often is silent regarding the trim details and any upgrades related to the vehicle. This leaves the dealer, bank, customer, auction, and other entities having to visually verify items such as trim levels, transmission, optional packages, and/or other equipment for the vehicle, which may be quite difficult or even impossible to do in some cases where the vehicle is in another location and/or without knowing exactly what to look for and being willing to spend the time to look in the appropriate places. Often manufacturers have packages such as "sport" or "convenience" and trim levels such as "touring" or "grand touring" that can equate to hundreds or thousands of dollars in added value. Often they are not designated on the vehicle and are not coded in the VIN, leaving only a select number of individuals with detailed factory knowledge able to accurately identify or verify these vehicles, resulting often in misrepresentation or errors in determining value. Such errors and/or misrepresentations can lead to added exposure, risk, liability, and lost revenue to parties involved such as lenders, dealers and auctions.

As loan approvals, loan terms, pricing and buying decisions are determined from a value of the vehicle which relies to some extent on this information, it is crucial to accurately determine a vehicle's build information, trim details and optional equipment.

BRIEF SUMMARY OF THE INVENTION

A hosted web-accessible system, computer program and methods are provided in accordance with various embodiments of the present disclosure for accurately generating vehicle build information such as trim and detailed equipment information for clients, which is comprehensive in that it includes information which is both coded and non-coded in the VIN and further both verifiable and non-verifiable via mere visual inspection of the vehicle. Comprehensive original vehicle data is obtained from vehicle manufacturers via a vehicle source interface, the data including a unique vehicle identifier for each of one or more vehicles associated with the respective source. A vehicle information request with a vehicle identifier is received from a client via a client request interface, and comprehensive original vehicle data is identified based on the unique identifier from the source and the identifier from the client request. A client response interface is generated for the purpose of, among other things, displaying the identified set of comprehensive original vehicle data.

In certain embodiments of the disclosure, a vehicle valuation is obtained from third party evaluators according to the vehicle request and based on the original vehicle data.

In further embodiments, supplemental data may be received from service providers and optionally presented as well.

DETAILED DESCRIPTION OF THE INVENTION

Figure 1:
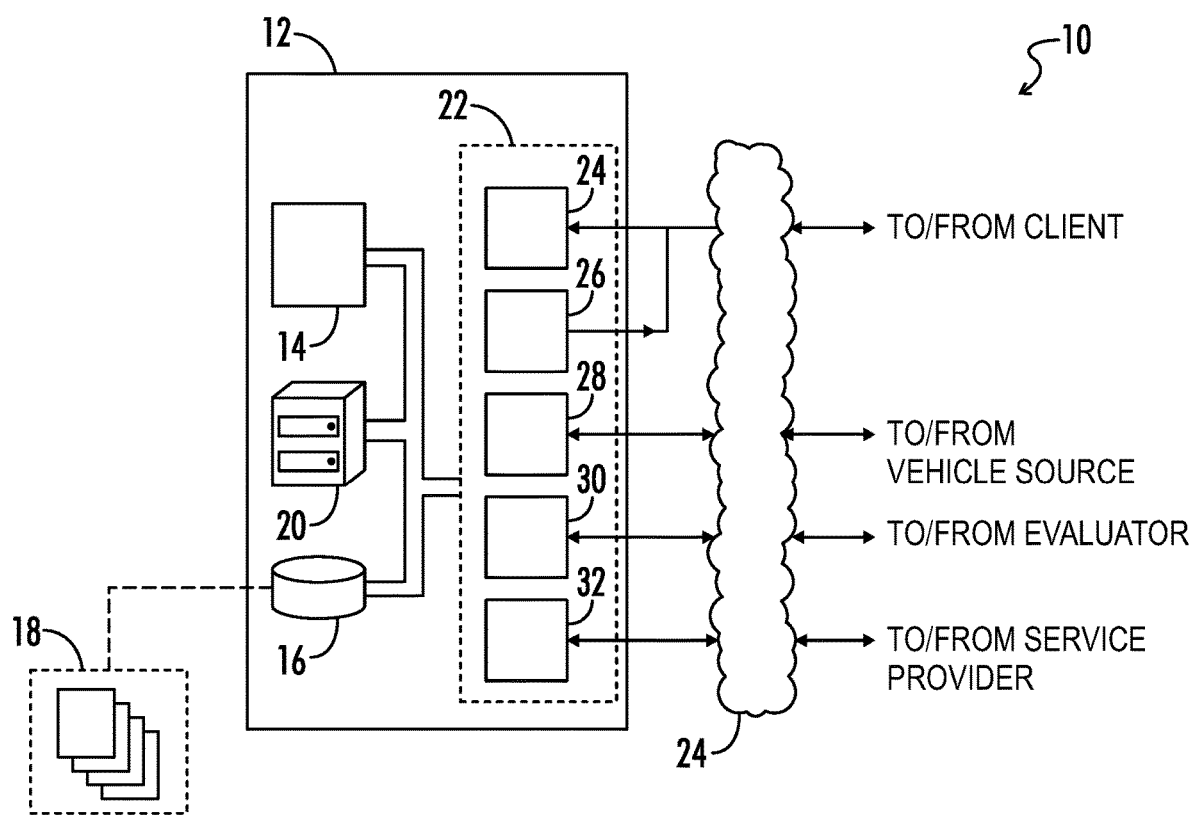
FIG. 1 is a block diagram representing an embodiment of a hosted system in accordance with the present disclosure.
Figure 2:
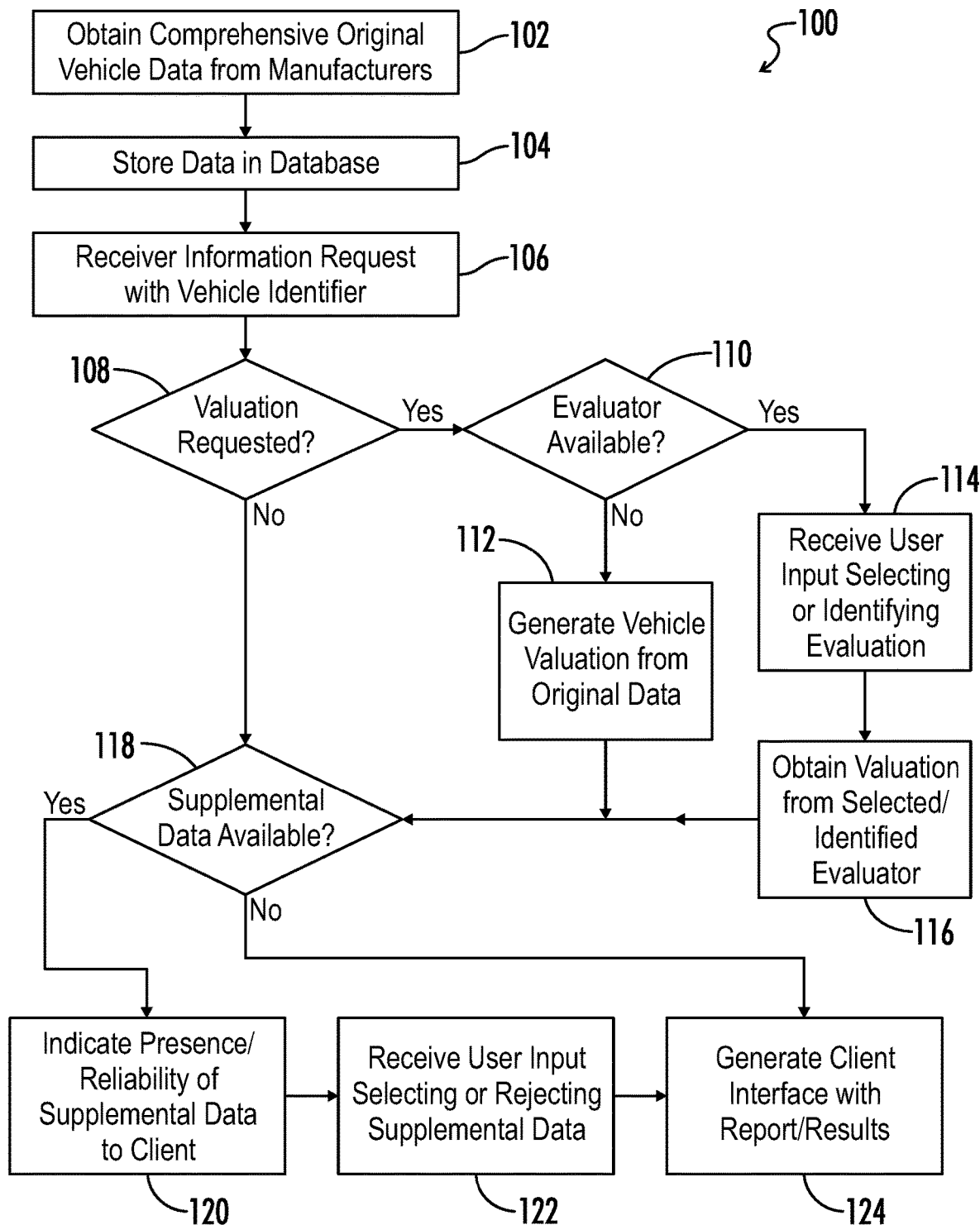
FIG. 2 is a flowchart representing an embodiment of a method in accordance with the present disclosure.

Referring generally to FIGS. 1 and 2, various embodiments are described herein for a system, program product, and associated methods for providing comprehensive vehicle build data, trim and other detailed vehicle information such as optional equipment. Clients of a hosted system according to the present disclosure may obtain or otherwise view a report of verified vehicle information having been originally provided from the vehicle manufacturer, and in certain embodiments may further obtain a valuation for the vehicle as generated by a third party vehicle evaluator, and/or supplemental data from third party service providers having access to vehicle data downstream from the associated manufacturers.

Where the various figures may describe embodiments sharing various common elements and features with other embodiments, similar elements and features are given the same reference numerals and redundant description thereof may be omitted below. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring first to FIG. 1, an embodiment of a web-based system 10 according to the present disclosure may be described. The term "web-based system" as used herein may, unless otherwise stated, refer generally to a platform effective to implement web-transitory functions, whether browser-based or otherwise. In other embodiments, the host system may include other computer-based platforms such as for example peer-to-peer structures which may not be explicitly web-based.

The system 10 is embodied by or within either of a central hosted server 12 or a plurality of servers 12 functionally linked and collectively defining a distributed host network (not shown). The server 12 as represented in FIG. 1 further includes a processor 14, a computer-readable memory medium 16, a database 20 and an I/O platform 22 which may typically include one or more user interfaces generated by program instructions or modules thereof in accordance with features, methods or steps described in greater detail below.

The term "computer-readable memory medium" as used herein may refer to any non-transitory medium 16 alone or as one of a plurality of non-transitory memory media 16 within which is embodied a computer program product 18 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The host server 12 may be accessible by or otherwise linked to various external and third party platforms via a communications network 34 and in accordance with these links is effective to collect, obtain, receive, transmit and/or share data using various communications protocols as are well known in the art. The term "communications network" 34 as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces as are known in the art.

The term "platform" as used herein may typically refer to a website, network, or alternative but equivalent interfaces for supporting multimedia interactivity consistent with the described features of the present disclosure.

The I/O platform 22 represented in FIG. 1 may typically refer to one or more websites including a plurality of web pages, pop-ups, links and the like, or alternatively email, text, or equivalent messaging platforms, which collectively define the plurality of user interfaces further described herein. Such interfaces as may be associated with or generated by the host system in accordance with the present disclosure may include without limitation a client request interface 24, a client response interface 26, a vehicle source interface 28, a third party evaluator interface 30, and a vehicle service provider interface 32. It may be understood that the distinct interfaces as represented in FIG. 1 may be defined by or within a single website or even webpage having overlapping functionality, but this is by no means necessary within the scope of the present disclosure, and for example a "service provider" in one aspect may be a "vehicle source" or "client" in another aspect having access to the associated interfaces of the system.

A "client" as referred to herein may refer to any entity obtaining or seeking to obtain vehicle information utilizing the system and associated features of the present disclosure, including without limitation lenders, dealers, auction offices, auto evaluators, insurance agencies, automobile websites, law enforcement agencies or officers, individual consumers, etc.

A "vehicle source" may typically refer to a vehicle manufacturer but may further refer to any entity providing verifiable and comprehensive original vehicle data in accordance with the present disclosure.

"Comprehensive original vehicle data" as used throughout this description includes all vehicle data which is made available by the source and is relevant to the vehicle build data, trim, any optional detail information, vehicle valuation, etc., and generally includes information which is both coded and non-coded with respect to the vehicle identifier, and verifiable or non-verifiable by a user. Examples of such vehicle data may include standard information such as without limitation year, make and model of the vehicle. Other examples include factory information such as without limitation equipment, trim details, color, transmission details, drive train, factory packages, and factory options. Other examples include drivetrain information such as without limitation whether the vehicle is a four-wheel drive (4WD), a two-wheel drive (2WD, automatic 4WD, or all-wheel Drive (AWD). A "vehicle service provider" may typically refer to any party that provides supplemental vehicle data such as current aftermarket replacements, upgrades, and the like with respect to a vehicle. A service provider may be the manufacturer itself, or more typically may be a third party. Such third parties may in various embodiments of the present disclosure be able to provide supplemental vehicle data, but this data may typically be separated from the original data and identified as being less reliable than data from the vehicle source, and even made optional for viewing by clients of the system, as further described below.

A vehicle manufacturer may associate a Vehicle Identification Number (VIN) as a unique identifier of a particular manufactured vehicle. The VIN may be coded by the manufacturer according to one or more vehicle attributes, as known in the art. For example, information such as vehicle manufacturer country, region, or world manufacturer identifier may be included. The vehicle's make, mole, engine, weight, year, manufacturing plant, or vehicle description (e.g., to identify attributes such as model, body style, engine, etc.) may be included. One or more digits may provide a vehicle identification section relating to plant and other values, such as production number. The manufacturer generates a unique VIN for a particular car based on the combination of vehicle attributes and a possible sequence number.

However, it is not possible for a vehicle manufacturer to code all vehicle attributes in the VIN. As such, to sufficiently describe or value a particular vehicle, additional information must be known. In one exemplary embodiment, a vehicle manufacturer creates non-coded vehicle information relating to one or more attributes not coded in a VIN. The non-coded vehicle information is associated with a unique vehicle in one exemplary embodiment. Additionally or alternatively, at least a portion of non-coded vehicle information may relate to a plurality of vehicles sharing a common attribute, such as in the case of a non-VIN code trim package. The vehicle manufacturer may store or cause to be stored the non-coded vehicle information, and/or may convey the non-coded vehicle information to one or more external receivers, either together with the coded vehicle information, or separate from the coded vehicle information. In one exemplary embodiment, the coded and non-coded vehicle information is generated by the vehicle manufacturer at or around the time of vehicle manufacture.

Referring now to FIG. 2, an exemplary method 100 in accordance with the present disclosure may be described. It may be understood that the various steps recited herein are not limiting on the scope of the present disclosure unless otherwise stated, and that accordingly the steps are not required to be executed in the order provided or even at all unless otherwise stated or where logic dictates.

In step 102, a host server receives, collects, imports, or otherwise obtains comprehensive original vehicle data directly from a vehicle source (typically the respective manufacturer) to ensure the accuracy of the associated information. The data may be obtained periodically from the source, for example at predetermined intervals, or simply as determined by the source such as where new data has become available. Generally speaking, the vehicle data may be transmitted via the communications network to a dedicated interface (e.g., secured web page, email address, etc.) in the form of an electronic data file, but alternatively may be simply made available for collection from a database residing on a source platform by program modules operating from the host server or otherwise executed by the host system on or within the source platform.

Typically, the comprehensive original vehicle data will include or be provided in association with a unique vehicle identifier, such as for example a VIN.

The data may upon importation or collection by the host system then be stored in a database (step 104). In various embodiments, the original data may be raw data from the source which is converted by the host system into a universal format for storage in a collective database. The raw data may be obtained using a predetermined format which merely requires the host system to parse, collate, arrange, etc., the data in order to properly store it within the database. Alternatively, the host system may require the use of algorithms or equivalent programmed functions to identify or characterize the raw data prior to storage. In some embodiments, each source/manufacturer may send raw data in a unique format which is configured to facilitate population of an intended client interface that is particular to the source, such as for example including source-specific trademarks, etc.

In certain embodiments of a host system within the scope of the present disclosure, vehicle service providers such as for example authorized dealers and the like may be allowed to provide supplemental (aftermarket) data to the system via a service provider interface. Where for example a service provider has modified, upgraded or removed some component as originally provided with respect to a particular vehicle, supplemental data may be provided to the system along with the unique vehicle identifier and then stored in the database alongside the comprehensive original vehicle data. The supplemental data will typically be stored in auxiliary portions of the database and not for example over or in place of the original data.

The supplemental data may further be stored in association with a service provider identifier. The particular service provider may in an embodiment be associated by the host system with a reliability score or the equivalent, so as to indicate the likelihood that the information is correct and complete based on prior dealings and/or client comments/feedback, or as a potential reflection on the quality of the vehicle itself after having received aftermarket servicing from that particular service provider, again based on prior dealings and/or client feedback. Algorithms for scoring the service providers, or interfaces for client feedback and association thereof with the particular service providers, may be executed by the host system automatically upon receipt of supplemental data or via a trigger where for example the service provider has previously received negative feedback or otherwise scored below a threshold value.

The client-specific portion of the process or in other words that related to a specific transaction or client request begins with step 106, wherein the host system receives a vehicle information request from a client via a dedicated interface (e.g., web page, pop-up data field, email address, etc.). The request typically shall include a vehicle identifier associated with the vehicle for which information is sought, and vehicle data corresponding with the particular vehicle may thereby be identified and retrieved from the database by matching the client-provided identifier with the unique identifier stored in association with the data. The vehicle identifier may be electronically scanned at the client end and submitted to the system interface, or alternatively manually entered via keystrokes and the like, equally within the scope of the present disclosure. Where the identifier is to be electronically scanned, the client-side hardware and associated software module necessary to generate the electronic identifier from (for example) the physical bar code is not itself generally associated with the host system of the present disclosure and further description is omitted herein as redundant.

In certain embodiments within the scope of the present disclosure, the system may generate a client response interface within or upon which is displayed at least a subset of the comprehensive original vehicle data for the identified vehicle (that which is associated with the vehicle identifier provided by the client), but not valuations or supplemental data. Such an embodiment may be optimal for an auction house, automobile website, or an equivalent client entity having no need of third party evaluations of the vehicle's value, or no desire to obtain potentially unreliable supplemental data from third party service providers. However, in other embodiments as are contemplated by a method 100 as represented in FIG. 2, such features may be at least optionally provided by the system, as further described below.

Where a client has requested a vehicle valuation from the system (i.e., "yes" in response to the query in step 108), it may further be determined whether a third party book evaluator is available to provide valuation with respect to the identified vehicle (step 110). In some embodiments, this step may be redundant where the system is configured to provide all valuations internally and without the option of obtaining such valuations from an external source. In either event, where no evaluator is available or otherwise provided by the system for client selection (i.e., "no" in response to the query in step 110), the method 100 continues to step 112 and generates a vehicle valuation based on the comprehensive original vehicle data stored in the database. Program instructions or program modules which may be executed by the system to determine the value may include proprietary algorithms with respect to the host but are not so limited within the scope of the present disclosure.

In some embodiments, the system may generate or determine a first vehicle valuation based on the original data and further determine a second vehicle valuation which is based on the original data and any available supplemental data, such that either may be displayed for the client based on client selection.

Where one or more evaluators are available and provided by the system (in for example a list) for client selection (i.e., "yes" in response to the query in step 110), the method 100 continues to step 114 and receives client input data representative of third party evaluator selection or identification. The system then obtains a vehicle valuation from the one or more evaluators selected or otherwise identified by the client (step 116).

As a first example of how the vehicle valuation may be obtained by the host system, a data field may be generated which includes the comprehensive original vehicle data (and in some embodiments any supplemental data) and then transmitted to the selected one or more third party evaluators. The vehicle identifier may in some cases be provided as well, but typically the vehicle data alone will be sufficient. The evaluator may then populate the data field with any additional requested or required information, including vehicle valuation data. The vehicle valuation data may include a vehicle valuation and any other data which may be useful or available with respect to the particular evaluator, or as requested by the system. The vehicle valuation data may include for example a first vehicle valuation based on the original data and a second vehicle valuation which is based on the original data and any available supplemental data, such that either may be displayed for the client based on client selection.

In a second example, the data field is generated by the system as described above. However, rather than transmitting the data field itself to the evaluator, the system may generate and transmit a valuation request to the selected third parties via the dedicated interface (e.g., web page, email, direct download, etc.), with the request comprising at least a portion of the comprehensive original vehicle data as determined to be relevant for valuation by the particular evaluators. The system may then receive the requested vehicle valuation data from the third party in any of a number of available formats, and subsequently populates the data field with a vehicle valuation based on the received vehicle valuation data, or otherwise stores the vehicle valuation data or a valuation derived therefrom in the database.

In a third example, the data field is generated as described above and then transmitted to the one or more selected/identified third party evaluators. Rather than return the data field to the host, the evaluator may simply provide the requested vehicle valuation data via for example an email or the like. The host receives the vehicle valuation data and then populates the data field with a vehicle valuation based on the received vehicle valuation data, or otherwise stores the valuation in the database in association with the original vehicle data.

The method 100 as represented in FIG. 2 may further in step 118 include determining whether or not supplemental data is available with respect to the identified vehicle (or whether the supplemental data feature is available in a given embodiment). If supplemental data is not available (for either reason), the method may proceed to step 124, and the system generates a client response interface which includes or otherwise displays some or all of the vehicle information results. Typically, the interface will not include all of the comprehensive vehicle information (which may be quite lengthy), but rather one or more subsets of the data in accordance with a predetermined template that is populated with the respective data. One or more templates may be provided for user selection in various embodiments, or for example a list of optional data sets may be provided to the user and a template created from a subsequent user selection. The interface may be a web page or part of a mobile device application, in which the results may be pushed out by the host system via the communications network and displayed, or for example an email having text results or an embedded electronic file with the results, or various alternative and equivalent interfaces as may be known to those of skill in the art.

If supplemental data is available (i.e., "yes" in response to the query of step 118), the method proceeds to step 120 and indicates to the client the presence of supplemental data associated with the identified vehicle. The system may further indicate the service provider that was the source of the supplemental data, and where supplemental data has been provided from more than one service provider, each provider may for example be listed. If the system is programmed or configured to determine a reliability score or otherwise collect feedback regarding the various service providers, such information may be provided as well for review by the client.

In step 122, the client may then provide input to the system representative of selection or rejection of one or more of the service providers and associated supplemental data for inclusion in the final report or displayed results, wherein the method 100 proceeds to step 124 as described above.

The system may be configured to receive and compare sets of information from a plurality of sources. The system may be further configured to compare at least a portion of the sets of information to one another and/or to known correct information. A result of the comparison may be conveyed to a requesting client. As part of the comparison, a set of known information known by each of the plurality of sources may be matched against each source. The result of the comparison may include an indication of the results of the matching process, including one or more errors associated with a specific of the plurality of sources relating to known information.

A vehicle valuation process may include comparing known information to at least one of a set of common information between third parties or a set of distinguishing information between third parties. The process may include obtaining a vehicle valuation for the identified set of vehicle data from a plurality of third party evaluators via the communications network, identifying a common set of information relating to the identified set of vehicle data from each of the plurality of third party evaluators, identifying a distinguishing set of information relating to the identified set of vehicle data from each of the plurality of third party evaluators, and generating the client response interface displaying the vehicle valuation in association with the identified set of comprehensive original vehicle data, the identified common set of information, and the identified distinguishing set of information.

For example, a first of three sources may erroneously identify a particular model, thereby impacting that source's estimated insurance or valuation estimate. A reader of the results would clearly recognize this difference, and at least one of a user or the system may compensate accordingly (e.g., by discrediting a source having incorrect information or by excluding that source from the results presented to a client). Additionally or alternatively, the system may recognize a source having superior vehicle information as compared to another source, and may highlight a more accurate estimate in the report.

The previous detailed description has been provided for the purposes of illustration and description. Thus, although there have been described particular embodiments of the present disclosure of a new and useful "Web-Based System and Method for Providing Comprehensive Vehicle Build Information," it is not intended that such references be construed as limitations upon the scope of this disclosure except as set forth in the following claims

What is claimed is:

1. A computer-implemented method of generating comprehensive vehicle data, the method comprising:
   receiving, at a hosted server, a set of comprehensive original vehicle data for each of a plurality of vehicles from one or more respective vehicle manufacturers via a vehicle source interface functionally linked to a communications network, wherein each set of comprehensive original vehicle data is associated with a respective unique vehicle identifier and includes both:
   standard vehicle data associated with the unique vehicle identifier, the standard vehicle data being coded by a respective vehicle manufacturer of the one or more respective vehicle manufacturers and included in the unique vehicle identifier for a respective vehicle of the plurality of vehicle identified by the unique vehicle identifier, and
   factory vehicle build data associated with the unique vehicle identifier, the factory vehicle build data being non-coded by the respective vehicle manufacturer and not included in the unique vehicle identifier for the respective vehicle, wherein the factory vehicle build data comprises original raw vehicle build data which is not included within the standard vehicle data and is not coded by the respective vehicle manufacturer into the unique vehicle identifier, and wherein the factory vehicle build data is received from the respective vehicle manufacturer;
   storing the set of comprehensive original vehicle data for each of the plurality of vehicles in a database;
   receiving a vehicle information request from a client via a client request interface, the request including a received vehicle identifier;
   identifying a requested set of comprehensive original vehicle data stored in the database based on the received vehicle identifier from the client request;
   automatically generating a vehicle trim level attribute value for the respective vehicle identified by the received vehicle identifier based on applying one or more stored trim level assessment algorithms related to the make or model to original raw vehicle build data for the corresponding vehicle, wherein the trim level assessment algorithm independently analyzes details for the respective vehicle generated at a time of build for the respective vehicle without subsequent verification; and
   generating a client response interface displaying vehicle data from the identified set of comprehensive original vehicle data.

2. The method of claim 1, further comprising the step of:
   converting the set of comprehensive original vehicle data into a universal format, wherein the database is effective to receive the original raw vehicle build data from a plurality of vehicle manufacturers having a like plurality of original data formats.

3. The method of claim 1, further comprising the steps of:
   determining a vehicle valuation for the requested set of comprehensive original vehicle data based on one or more predetermined valuation criteria and the vehicle trim level attribute value, and
   generating the client response interface displaying the vehicle valuation in association with the requested set of comprehensive original vehicle data.

4. The method of claim 1, further comprising the steps of:
   obtaining a vehicle valuation for the requested set of comprehensive original vehicle data from a third party evaluator via the communications network, and
   generating the client response interface displaying the vehicle valuation in association with the requested set of comprehensive original vehicle data.

5. The method of claim 4, the step of obtaining a vehicle valuation for the requested set of comprehensive original vehicle data from a third party evaluator further comprising the steps of:
   generating a data field including the requested set of comprehensive original vehicle data;
   receiving client input selecting the third party evaluator from a list of available third party evaluators via the client request interface;
   transmitting the data field to the selected third party via the communications network; and
   receiving the data field from the third party further including vehicle valuation data provided by the third party.

6. The method of claim 4, the step of obtaining a vehicle valuation for the requested set of comprehensive original vehicle data from a third party evaluator further comprising the steps of:
   generating a data field including the requested set of comprehensive original vehicle data;
   receiving client input selecting the third party evaluator from a list of available third party evaluators via the client request interface;
   transmitting a valuation request to the selected third party via the communications network, the request comprising at least a portion of the identified set of comprehensive original vehicle data;

receiving vehicle valuation data from the third party; and populating the data field with the vehicle valuation based on the received vehicle valuation data.

7. The method of claim 4, the step of obtaining a vehicle valuation for the requested set of comprehensive original vehicle data from a third party evaluator further comprising the steps of:

generating a data field including the requested set of comprehensive original vehicle data;

receiving client input selecting the third party evaluator from a list of available third party evaluators via the client request interface;

transmitting the data field to the selected third party via the communications network;

receiving vehicle valuation data from the third party evaluator; and populating the data field with the vehicle valuation based on the received vehicle valuation data.

8. The method of claim 1, further comprising the steps of:

receiving, at the hosted server, one or more sets of supplemental vehicle data from one or more vehicle service providers via a vehicle service provider interface functionally linked to the communications network, each set of supplemental vehicle data associated with a respective unique vehicle identifier;

storing the supplemental vehicle data in the database in association with the comprehensive original vehicle data and with the respective vehicle service provider; and generating the client response interface displaying the requested set of comprehensive original vehicle data and the associated supplemental vehicle data.

9. The method of claim 8, the step of generating the client response interface displaying the requested set of comprehensive original vehicle data and the associated supplemental vehicle data, further comprising the steps of:

indicating to the client via the client response interface that supplemental vehicle data from the one or more service providers is available with respect to the requested set of comprehensive original vehicle data;

receiving client input via the client response interface corresponding to a selection of none, some or all of the supplemental vehicle data; and generating the client response interface displaying the requested set of comprehensive original vehicle data and any supplemental vehicle data selected by the client in accordance with the received client input.

10. The method of claim 1, further comprising the steps of:

obtaining a vehicle valuation for the requested set of comprehensive original vehicle data from a plurality of third party evaluators via the communications network;

identifying a common set of information relating to the requested set of comprehensive original vehicle data from each of the plurality of third party evaluators;

identifying a distinguishing set of information relating to the requested set of comprehensive original vehicle data from each of the plurality of third party evaluators; and generating the client response interface displaying the vehicle valuation in association with the requested set of comprehensive original vehicle data, the identified common set of information, and the identified distinguishing set of information.

11. A hosted server system comprising a non-transitory computer-readable medium having program instructions residing thereon, the program instructions configured upon execution by a processor to direct the performance of operations comprising:

receiving a set of comprehensive original vehicle data for each of a plurality of vehicles from one or more respective vehicle manufacturers via a vehicle source interface functionally linked to a communications network, wherein each set of comprehensive original vehicle data is associated with a respective unique vehicle identifier and includes both:

standard vehicle data associated with the unique vehicle identifier, the standard vehicle data being coded by a respective vehicle manufacturer of the one or more respective vehicle manufacturers and included in the unique vehicle identifier for a respective vehicle of the plurality of vehicle identified by the unique vehicle identifier, and factory vehicle build data associated with the unique vehicle identifier, the factory vehicle build data being non-coded by the respective vehicle manufacturer and not included in the unique vehicle identifier for the respective vehicle, wherein the factory vehicle build data comprises original raw vehicle build data which is not included within the standard vehicle data and is not coded by the respective vehicle manufacturer into the unique vehicle identifier, and wherein the factory vehicle build data is received from the respective vehicle manufacturer;

receiving a vehicle information request from a client via a client request interface, the request including a received vehicle identifier;

identifying a requested set of comprehensive original vehicle data based on the received vehicle identifier from the client request;

automatically generating a vehicle trim level attribute value for the respective vehicle identified by the received vehicle identifier based on applying one or more stored trim level assessment algorithms related to the make or model to original raw vehicle build data for the corresponding vehicle, wherein the trim level assessment algorithm independently analyzes details for the respective vehicle generated at a time of build for the respective vehicle without subsequent verification; and generating a client response interface displaying vehicle data from the identified set of comprehensive original vehicle data.

12. The system of claim 11, wherein the standard vehicle data comprises one or more of a country of origin, manufacturer, year of manufacture, manufacturing assembly plant, make, and model for the respective vehicle.

13. The system of claim 12, wherein the factory vehicle data comprises one or more of equipment, trim details, color, transmission details, drive train, factory packages, and factory options for the respective vehicle.

14. The system of claim 11, wherein the instructions are further configured upon execution by a processor to direct the performance of operations comprising converting the original raw vehicle build data into a universal format wherein the database is effective to receive the original raw vehicle build data from a plurality of vehicle manufacturers having a like plurality of original data formats.

15. The system of claim 11, wherein the instructions are further configured upon execution by a processor to direct the performance of operations comprising determining a vehicle valuation for the requested set of comprehensive original vehicle data based on one or more predetermined valuation criteria, and generating the client response interface displaying the vehicle valuation in association with the requested set of comprehensive original vehicle data.

16. The system of claim 11, wherein the instructions are further configured upon execution by a processor to direct the performance of operations comprising obtaining a vehicle valuation for the requested set of comprehensive original vehicle data from a third party evaluator via the communications network, and generating the client response interface displaying the vehicle valuation in association with the requested set of comprehensive original vehicle data.

17. The system of claim 16, wherein the instructions are further configured upon execution by a processor to direct the performance of operations comprising obtaining a vehicle valuation for the requested set of comprehensive original vehicle data from a third party evaluator by further directing the performance of operations comprising:
- generating a data field including the requested set of comprehensive original vehicle data;
- receiving client input selecting a third party evaluator from a list of available third party evaluators via the client request interface;
- transmitting the data field to the selected third party via the communications network; and
- receiving the data field from the third party further including vehicle valuation data provided by the third party.

18. The system of claim 16, wherein the instructions are further configured upon execution by a processor to direct the performance of operations comprising obtaining a vehicle valuation for the requested set of comprehensive original vehicle data from a third party evaluator by further directing the performance of operations comprising:
- generating a data field including the requested set of comprehensive original vehicle data;
- receiving client input selecting a third party evaluator from a list of available third party evaluators via the client request interface;
- transmitting a valuation request to the selected third party via the communications network, the request comprising at least a portion of the identified set of comprehensive original vehicle data;
- receiving vehicle valuation data from the third party; and
- populating the data field with the vehicle valuation based on the received vehicle valuation data.

19. The system of claim 11, wherein the instructions are further configured upon execution by a processor to direct the performance of operations comprising:
- receiving at the hosted server one or more sets of supplemental vehicle data from one or more vehicle service providers via a vehicle service provider interface functionally linked to the communications network, each set of supplemental vehicle data associated with a respective unique vehicle identifier;
- storing the supplemental vehicle data in a data repository in association with the original data and with the respective service provider; and
- generating the client response interface displaying the requested set of comprehensive original vehicle data and the associated supplemental vehicle data.

20. A computer-implemented method of generating comprehensive vehicle data, the method comprising:
- receiving at a hosted server a set of comprehensive original vehicle data for each of a plurality of vehicles from one or more respective vehicle manufacturers via a vehicle source interface functionally linked to a communications network, wherein each set of comprehensive original vehicle data is associated with a respective unique vehicle identifier and includes both:
  - standard vehicle data associated with the unique vehicle identifier, the standard vehicle data being coded by a respective vehicle manufacturer of the one or more respective vehicle manufacturers and included in the unique vehicle identifier for a respective vehicle of the plurality of vehicle identified by the unique vehicle identifier, and
  - factory vehicle build data associated with the unique vehicle identifier, the factory vehicle build data being non-coded by the respective vehicle manufacturer and not included in the unique vehicle identifier for each of the one or more vehicles, wherein the factory vehicle build data comprises original raw vehicle build data which is not included within the standard vehicle data and is not coded by the respective vehicle manufacturer into the unique vehicle identifier, and wherein the factory vehicle build data is received from the respective vehicle manufacturer;
- storing the set of comprehensive original vehicle data for each of the plurality of vehicles in a database;
- receiving one or more sets of supplemental data, wherein the one or more sets of supplemental data relates to aftermarket vehicle data not included in the standard vehicle data coded by the respective vehicle manufacturer and not included in the factory vehicle build data which is non-coded by the vehicle manufacturer;
- determining a reliability score associated with a provider of the one or more sets of supplemental data;
- associating the reliability score associated with the provider of the one or more sets of supplemental data with the one or more sets of supplemental data;
- selectively including or excluding supplemental data for valuation based at least on part on the reliability score associated with the provider of the one or more sets of supplemental data; and
- generating a client response interface displaying vehicle data from the comprehensive original vehicle data, the one or more sets of supplemental data, and the reliability score associated with the provider of the one or more sets of supplemental data,
- automatically generating a vehicle trim level attribute value for the respective vehicle identified by the received vehicle identifier based on applying one or more stored trim level assessment algorithms related to the make or model to original raw vehicle build data for the corresponding vehicle, wherein the trim level assessment algorithm independently analyzes details for the respective vehicle generated at a time of build for the respective vehicle without subsequent verification;
- obtaining a vehicle valuation for the identified set of vehicle data from a third party evaluator via the communications network, and
- generating the client response interface displaying the vehicle valuation in association with the identified set of comprehensive original vehicle data.

* * * * *